United States Patent

Kreisl et al.

[19]

[11] Patent Number: 6,142,275
[45] Date of Patent: Nov. 7, 2000

[54] PRESSURE-ACTUATED CLUTCH AND BRAKE

[75] Inventors: Joachim Kreisl, Leverkusen; Norbert Gober, Odenthal, both of Germany

[73] Assignee: SMS Eumuco GmbH, Leverkusen, Germany

[21] Appl. No.: 08/860,540

[22] PCT Filed: Dec. 12, 1995

[86] PCT No.: PCT/DE95/01776

§ 371 Date: Jul. 31, 1997

§ 102(e) Date: Jul. 31, 1997

[87] PCT Pub. No.: WO96/18830

PCT Pub. Date: Jun. 20, 1996

[30] Foreign Application Priority Data

Dec. 13, 1994 [DE] Germany .............................. 44 44 282

[51] Int. Cl.$^7$ .............................. F16D 67/04; B30B 15/12
[52] U.S. Cl. .................................... 192/18 A; 192/113.34
[58] Field of Search .............................. 192/18 A, 12 C, 192/113.34; 100/282

[56] References Cited

U.S. PATENT DOCUMENTS

| | | | |
|---|---|---|---|
| 4,094,393 | 6/1978 | Spokas | 192/113.34 X |
| 4,566,572 | 1/1986 | Flotow et al. | 192/113.34 X |
| 4,633,986 | 1/1987 | Matson | 192/18 A |
| 5,667,045 | 9/1997 | Cummings | 192/18 A |
| 5,769,187 | 6/1998 | Sommer | 192/18 A X |

FOREIGN PATENT DOCUMENTS

| | | |
|---|---|---|
| 0 174 256 | 3/1986 | European Pat. Off. . |
| 0 287 472 | 10/1988 | European Pat. Off. . |
| 1 425 271 | 3/1969 | Germany . |
| 2123330 | 11/1972 | Germany . |
| 2100536 | 4/1973 | Germany . |
| 90 14 112 | 1/1991 | Germany . |
| 2 041 480 | 9/1980 | United Kingdom . |

*Primary Examiner*—Rodney H. Bonck
*Attorney, Agent, or Firm*—Herbert Dubno; Andrew Wilford

[57] ABSTRACT

A press has a nonrotating tube shaft centered on an axis, a rotatable output shaft coaxially received in the tube shaft and having a shaft end, and a supply of fluid under pressure. A brake element fixed on the tube shaft forms with an axially movable brake element angularly coupled with the output shaft a pressurizable brake chamber. A fluid line extending from the brake chamber through the tube shaft to the fluid supply can pressurize the brake chamber and thereby couple the brake elements with each other so that the output shaft is braked against the tube shaft. A flywheel rotatable about the axis on the tube shaft carries a first clutch element rotatable about the axis. A second clutch element rotatable about the axis adjacent the first clutch element forms therewith a pressurizable clutch chamber. Another fluid line extending from the clutch chamber to the fluid supply can pressurize the clutch chamber and thereby couple the clutch elements with each other so that the output shaft is coupled to the flywheel.

5 Claims, 1 Drawing Sheet

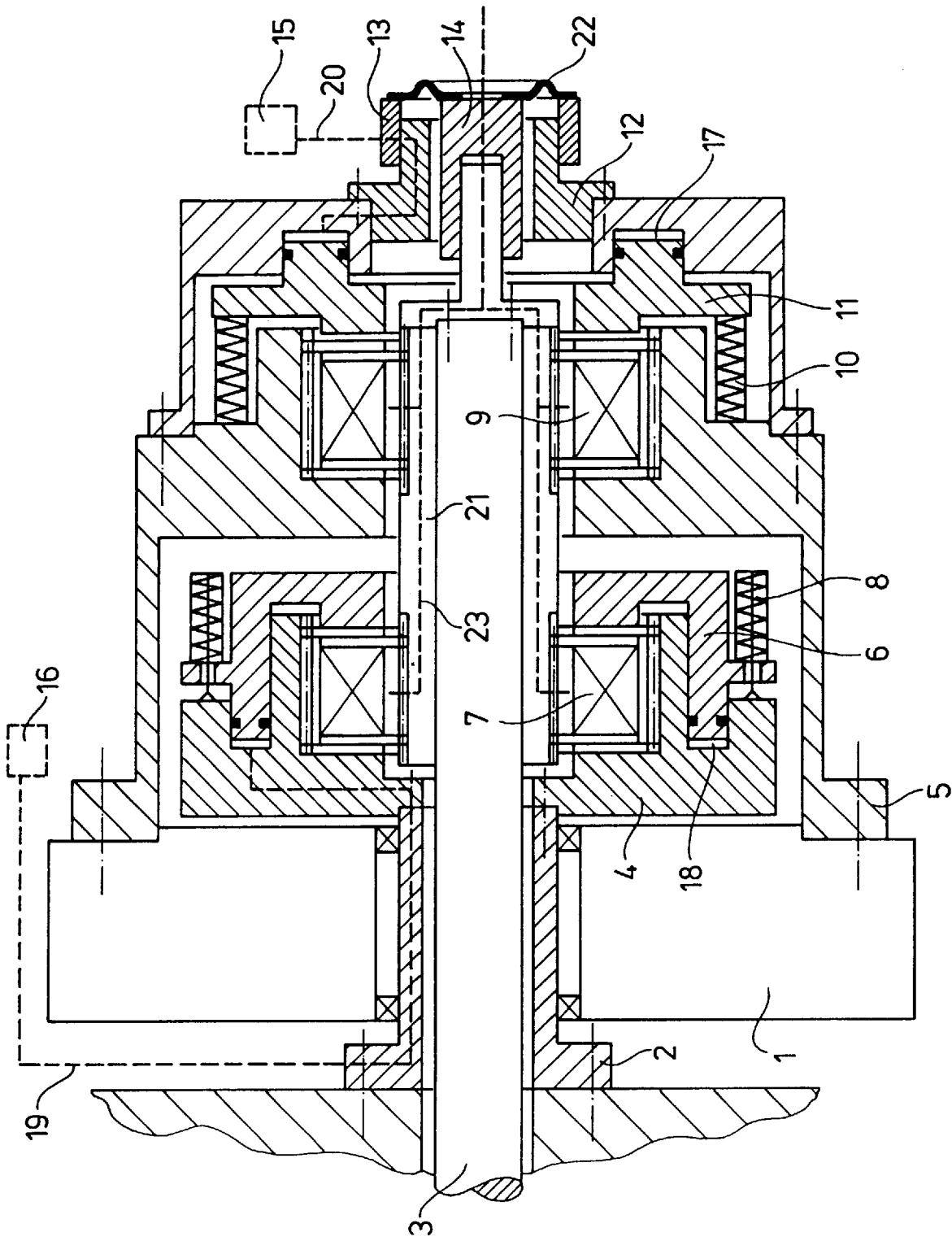

PRESSURE-ACTUATED CLUTCH AND BRAKE

CROSS REFERENCE TO RELATED APPLICATIONS

This application is the US national phase of PCT application PCT/DE95/01776 filed Dec. 12, 1995 with a claim to the priority of German application P44 44 282.3 itself filed Dec. 13, 1994.

FIELD OF THE INVENTION

The invention relates to the construction of a clutch and a brake, in particular for mechanical presses and shears for massive and sheet-metal deformation.

BACKGROUND OF THE INVENTION

A number of pressure-actuated clutches and brakes are known which according to application—starting and stopping of machine elements—are grouped in separate arrangements of clutches and brakes and in combined systems. With the separately arranged clutches and brakes one normally mounts then at the opposite ends of an output shaft and provides separate connections for their actuation and cooling. Most combined arrangements with the clutch and brake at one shaft end have corresponding common actuating and coolant connections. Thus for example with the known solutions (German 2,753,534 and 2,128,242 and U.S. Pat. No. 4,006,808) of combined clutch and brake systems the clutch and brake are preferably combined at one shaft end.

Advantageous for the combined clutches and brakes are the simplified control due to only one spring-loaded actuating piston, the use of only one end of the output shaft, and the offset of the feeds of hydraulic and cooling mediums from the supply system, all at only one shaft end. The expense for sealing against other machine elements is also smaller and assembly can be simplified.

As a result of only one actuating piston the control arrangement is simplified, for example only one press safety valve is necessary. For some types of machines the one-ended mounting also changes the entire construction of the machine in a positive manner, making it more compact.

In contrast thereto there are substantial disadvantages compared to separately built clutches and brakes, on the one hand due to the increased inertia due to the construction and on the other hand to the time lost on actuation between operating the clutch and the brake as a result of the travel time of the single actuating piston. In particular with very large actuating volumes this lost time can increase the individual switchover times of the machine. In addition the output of the machine during the shift is neither held by the clutch nor by the brake which can lead for example in wedge presses to undesired travel of the ram.

Furthermore in the combined assemblies very big disks are necessary for mounting of the actuating surfaces and the springs in order to be able to accommodate these shifting elements in the assembly and to obtain a complete construction. For large torques, e.g. on forging presses, particularly expensive solutions (as in East German patent 260,111) are known for making the disks. A further disadvantage is in the limited space available for the high spring forces inside the inside periphery of the disks.

OBJECTS OF THE INVENTION

The goal of the invention is to arrange a clutch and brake preferably on presses in such a manner that the above-mentioned disadvantages of the combined systems are avoided and a separately arranged clutch and brake are provided which facilitate the mounting on one shaft end.

It is an object of the invention to provide a separately actuated clutch and brake at one end of the output shaft and thus to provide a complete unit with respect to mounting, sealing of the feed lines from the supplies for operation. In addition the inertia of the clutch and brake should be as small as possible and the use of conventional disk dimensions for the maximum torque should be possible. In addition an undefined rest position of the output side (of the ram) during switching from the clutch to the brake and back should be avoided.

SUMMARY OF THE INVENTION

This is achieved according to the invention in that the hydraulic feed for the chamber of the brake is effected through the tube shaft.

BRIEF DESCRIPTION OF THE DRAWING

The above and other objects and features of the invention are more closely described in the following with reference to the drawing whose sole FIGURE is a partly diagrammatic axial section through the combined clutch/brake assembly of the instant invention.

SPECIFIC DESCRIPTION

A preferred embodiment of the invention is more closely described in the following with reference to an example. The drawing shows a clutch and brake according to the invention. The flywheel 1 is journaled on the tube shaft 2. The brake housing 4 with the brake disks 7 is connected to the tube shaft 2 which is fixed to the machine housing. The brake piston 6 is mounted in the brake housing 4 and coaxial to the brake disks 7, braced against the brake springs 8. The hydraulic feed to the chamber 18 of the brake is through the line 19 from the press safety valve 16 through the tube shaft 2.

The brake housing 4, brake piston 6, compression springs 8, and brake disks 7 together form the brake unit. Actuation of the press safety valve 16 releases the brake to the force of the brake springs 8. The clutch housing 5 with the clutch disks 9, the clutch springs 10, the clutch piston 11, and the hydraulic connection 12 are fixed on the flywheel 1.

Actuation of the press safety valve 15 closes the clutch against the force of the clutch springs 10 with the hydraulic fluid passing via the nonrotating housing with the hydraulic connection 13 via the rotating hydraulic connection 12 into the chamber 17 of the clutch. Coaxial to the hydraulic connection 12 of the clutch is the nonrotating housing 14 for rotary connection of the feed for the coolant into the disk carrier 21 which is mounted on the output shaft 3. In order to avoid an offcenter condition of the output shaft 3 relative to the flywheel caused by the driving and driven elements in the clutch-open position, there is a radially elastically deformable seal 22. The coolant for the clutch and brake is fed in through a common rotary connection. How it is conducted away is not shown, this takes place in the known manner through the tube shaft 3, through the flywheel 1, or into an unillustrated common housing for the clutch and brake. Preassembly and preacceptance of the clutch and brake can take place in two separate actuation units which can be combined together on construction of the press into a compact construction similar to the combined devices at one end of the output shaft 3.

What is claimed is:

1. A press comprising:

a nonrotating tube shaft centered on an axis;

a rotatable output shaft coaxially received in the tube shaft and having a shaft end;

a supply of fluid under pressure;

a brake element fixed on the tube shaft;

an axially movable brake element angularly coupled with the output shaft and forming with the fixed brake element a pressurizable brake chamber;

brake-actuating means including a fluid line extending from the brake chamber through the tube shaft to the fluid supply for pressurizing the brake chamber and thereby coupling the brake elements with each other, whereby the output shaft is braked against the tube shaft;

a flywheel rotatable about the axis on the tube shaft;

a first clutch element rotatable about the axis and angularly coupled to the flywheel;

a second clutch element rotatable about the axis adjacent the first clutch element and forming therewith a pressurizable clutch chamber; and clutch-actuating means including another fluid line extending from the clutch chamber to the fluid supply for pressurizing the clutch chamber and thereby coupling the clutch elements with each other, whereby the output shaft is coupled to the flywheel.

2. The press defined in claim 1, further comprising brake disks between the brake elements, the brake chamber being annular and surrounding the brake disks.

3. The press defined in claim 1, further comprising respective sets of disks between the clutch elements and brake elements;

a common carrier element on the output shaft supporting the disks;

a coolant supply; and means including a line extending from the lubricant supply through the common carrier element to the disks for supplying coolant to the disks.

4. The press defined in claim 3 wherein the fluid line of the clutch-actuating means extends from the clutch chamber in one axial direction to the respective supply and the fluid line of the brake-actuating means extends from the brake chamber through the tube shaft in the opposite axial direction to the respective supply.

5. The press defined in claim 3, further comprising an elastic seal ring between the output shaft and one of the clutch members.

* * * * *